United States Patent [19]

Sandberg

[11] 4,427,308
[45] Jan. 24, 1984

[54] HYDROKINETIC SPINDLE ASSEMBLY

[76] Inventor: John R. Sandberg, 926 Main St., Robstown, Tex. 78380

[21] Appl. No.: 344,474

[22] Filed: Feb. 1, 1982

[51] Int. Cl.³ ..................... F16C 32/06; F16C 33/10
[52] U.S. Cl. .................................. 384/115; 384/123; 384/378; 384/398; 384/400; 384/412
[58] Field of Search ............. 384/114, 115, 398, 400, 384/401, 403, 404, 378, 120, 123, 412

[56] References Cited

U.S. PATENT DOCUMENTS

| 218,094 | 7/1879 | Ward | 384/378 |
|---|---|---|---|
| 486,061 | 11/1892 | Bache | 384/394 |
| 808,197 | 12/1905 | Decker | 384/373 |
| 2,066,281 | 12/1936 | Traylor et al. | 384/378 X |
| 2,430,752 | 11/1947 | Yager | 384/144 |
| 2,510,549 | 6/1950 | Buchi | 384/398 |
| 3,368,799 | 2/1968 | Sluijters | 384/378 |
| 3,669,517 | 6/1972 | Hughes | 384/115 |
| 3,981,547 | 9/1976 | Perruzzi | 384/398 |
| 4,003,562 | 1/1977 | Kaiser et al. | 384/130 X |

Primary Examiner—Stuart S. Levy
Assistant Examiner—Thomas R. Hannon
Attorney, Agent, or Firm—Wicks & Nemer

[57] ABSTRACT

A hydrokinetic spindle including a housing having a bearing in which the journal portion of a shaft is mounted. The shaft has a helical groove having a progressively decreasing cross-section formed on the journal surface thereof and extending from one end of the journal portion to the other which picks up a predetermined amount of fluid lubricant from fluid pickup posts leading from at least one fluid reservoir formed in the housing and directs the lubricant to and upon the shaft under pressure thereby maintaining a film of fluid lubricant under pressure between the shaft and the bearing of the housing. The housing and shaft are sealed in an artificial atmosphere.

10 Claims, 7 Drawing Figures

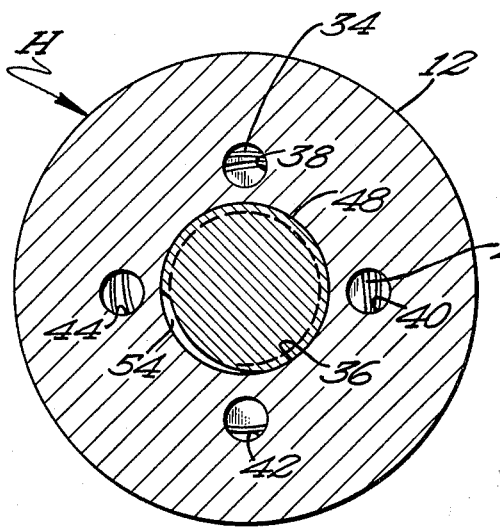
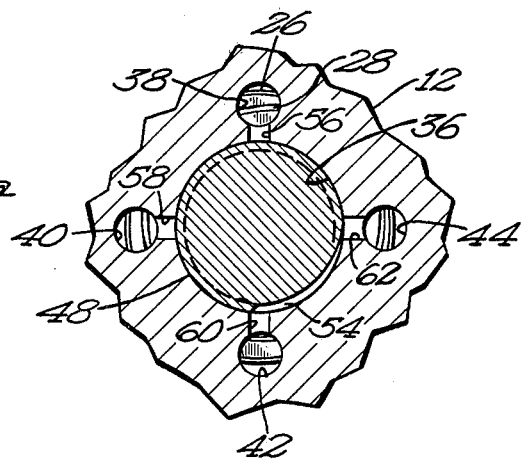
Fig 4   Fig 5
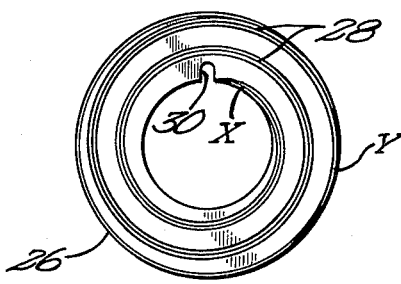
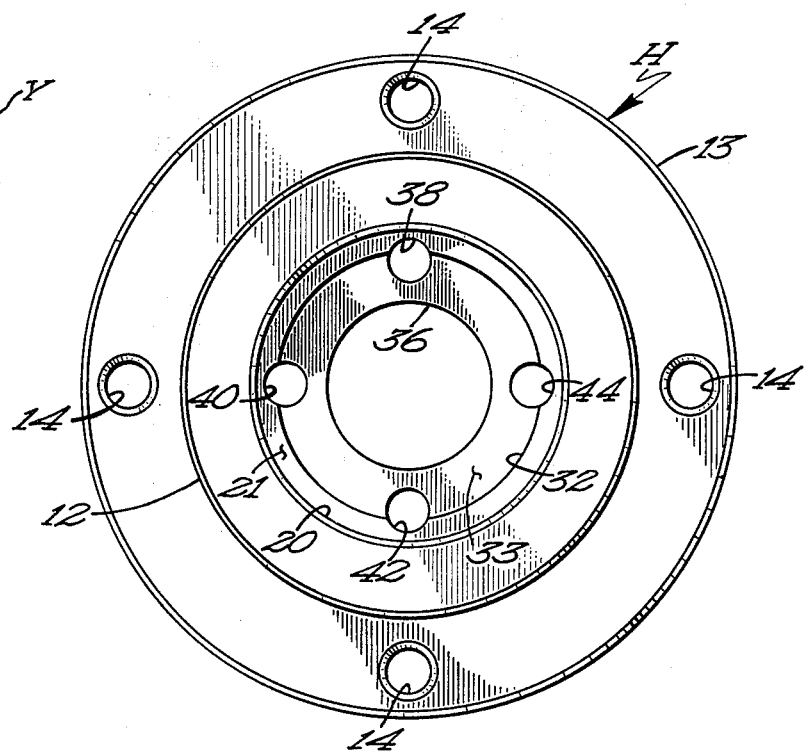
Fig 6   Fig 7

HYDROKINETIC SPINDLE ASSEMBLY

SUMMARY

The invention relates broadly to bearings and more particularly to a hydrokinetic spindle assembly having a lubricated shaft.

It is an object of the invention to provide a hydrokinetic spindle having a housing with a shaft extending therethrough for relative rotation between the housing and the shaft.

It is a further object of the invention to provide a shaft mounted in a bearing in a housing sealed with an internal artificial atmosphere which may be created by the introduction of gaseous nitrogen into the housing prior to the final sealing of the unit. The shaft has a helical groove formed on the surface thereof which picks up a predetermined amount of fluid lubricant from fluid pickup posts leading from at least one fluid reservoir at one end thereof and directs the lubricant to and upon the shaft under pressure to the other end and thence to the reservoir thereby maintaining a film of fluid lubricant under pressure between the shaft surface and the bearing of the housing. The pressure referred to initiates at as low as 5 r.p.m.

PATENTS KNOWN TO APPLICANT

U.S. Pat. No. 218,094—Ward;
U.S. Pat. No. 486,061—Bache;
U.S. Pat. No. 808,197—Decker;
U.S. Pat. No. 1,954,245—Janca;
U.S. Pat. No. 2,066,281—Traylor et al;
U.S. Pat. No. 2,430,752—Yager;
U.S. Pat. No. 3,368,799—Sluijters;
U.S. Pat. No. 3,981,547—Perruzzi
U.S. Pat. No. 4,003,562—Kaiser.

The invention will appear more clearly from the following detailed description when taken in connection with the accompanying drawings, showing by way of example a preferred embodiment of the inventive idea wherein like numerals refer to life parts throughout.

In the drawings forming part of this application:

FIG. 4 is a sectional view on the line 4—4 of FIG. 2.

FIG. 5 is a sectional view on the line 5—5 of FIG. 2.

FIG. 6 is a face view of a thrust washer on the line 6—6 of FIG. 3.

FIG. 7 is a view on the line 7—7 of FIG. 3.

Figure 1:
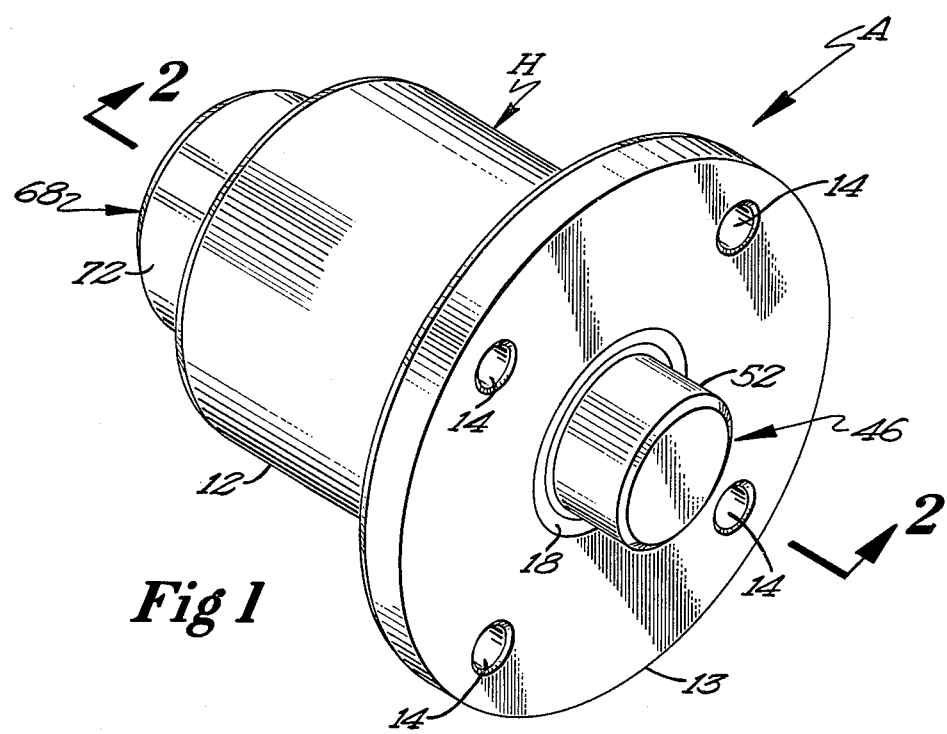
FIG. 1 is a perspective view of a hydrokinetic spindle embodying the invention.
Figure 2:
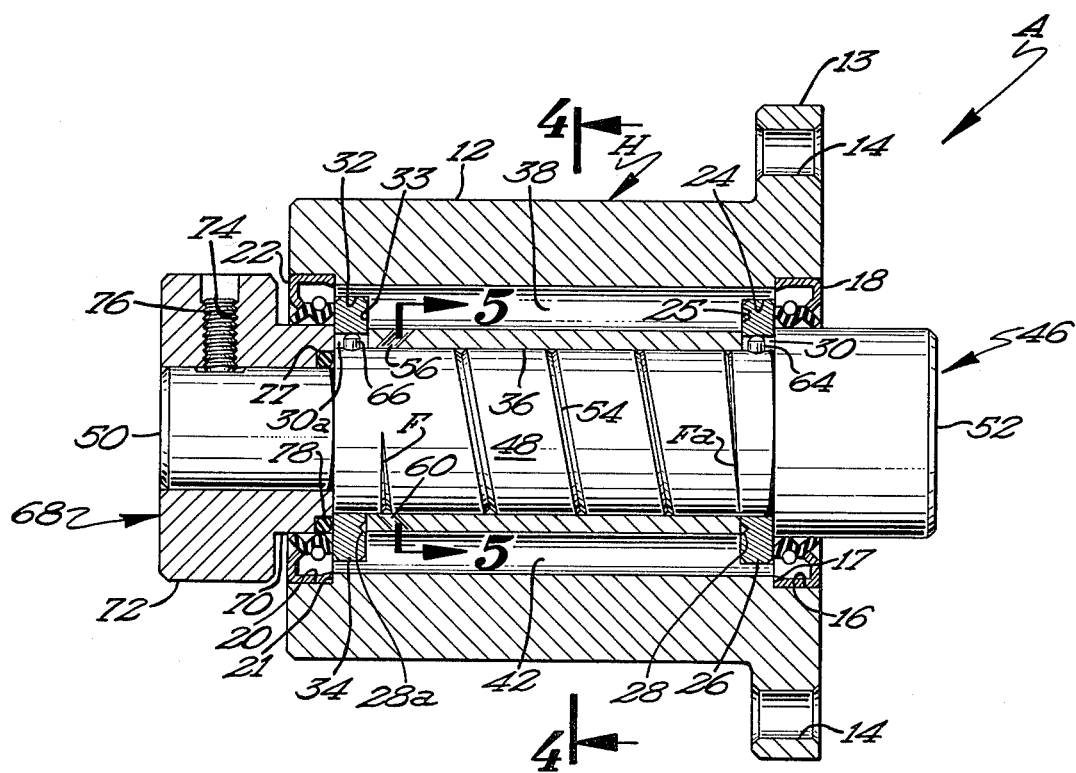
FIG. 2 is a sectional view on the line 2—2 of FIG. 1.
Figure 3:
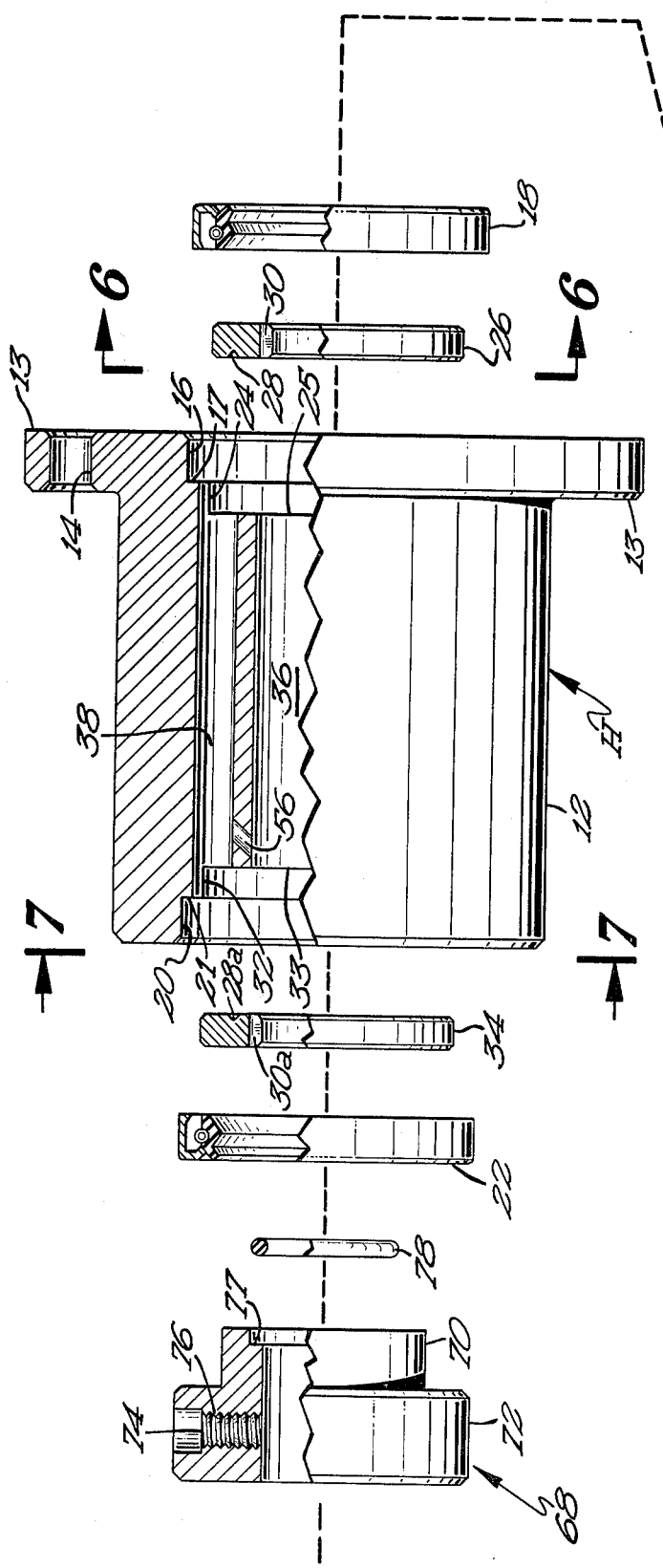
FIG. 3 is an exploded longitudinal side elevational view of the spindle with portions thereof in section and other portions broken away.
Figure 3:
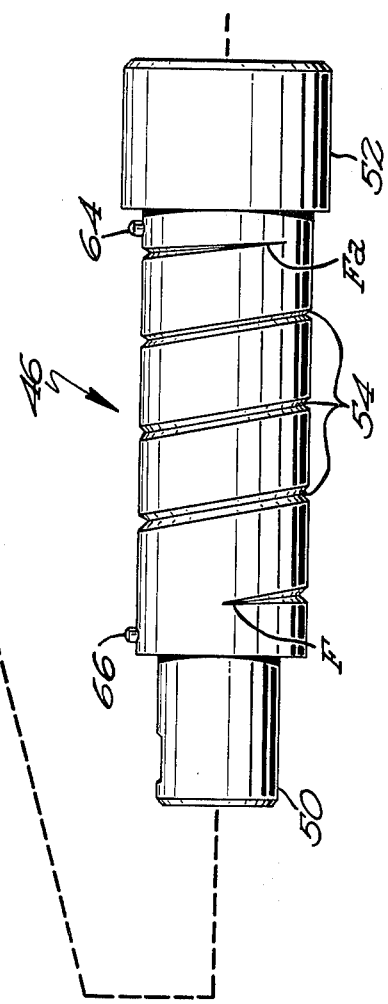

Referring to the drawings in detail, the hydrokinetic spindle A includes the housing H which includes the tubular portion 12 formed with the radially and outwardly extending flange 13 on one end of the portion 12. The flange has formed therein the bolt holes 14.

Formed internally of the tubular housing portion 12 at one end is the first annular groove 16 in which the conventional annular seal 18 is press fit and against the shoulder 17 formed by the groove 16. At the other end of the portion 12 is a second annular groove 20 in which the conventional annular seal 22 is press fit and against the shoulder 21 formed by the groove 20. The numeral 24 designates a third annular recess formed in the housing portion 12 in which the first thrust washer 26 rotates and against the shoulder 25 formed by the recess 24. The washer 26 has formed on one flat face thereof the spiral groove 28 starting at the inner edge as at the "X" and terminating at the outer edge as at "Y". The groove 28 aids in maintaining a film of lubricant on the inner face and outer edge of the thrust washer and movement of lubricant to and from the reservoir and the shaft surface. The inner edge of the washer is formed with the notch 30.

The housing portion 12 has formed therein the fourth annular recess 32 in which a second thrust washer 34 rotates against the shoulder 33 formed by the recess 32. The second thrust washer 34 is identical to the first thrust washer 26 with like parts bearing the same numeral but accompanied by a lower case letter a.

The numeral 36 designates bearing means in the form of the axial bore formed in the tubular housing and extending between recess 24 and recess 32. Further provided is a first reservoir 38 formed in the portion 12 which extends axially of the bore 36 between grooves 16 and 20 spaced radially outwardly of the bore. Reservoirs 40, 42 and 44 are identical to reservoir 38 and are spaced 90 degrees each from the other about the bore 36.

Further included is the shaft 46 which includes the central journal portion 48 which terminates at one end in the reduced portion 50 and at the other end in the enlarged portion 52. The central portion 48 is of a diameter slightly less than that of the diameter of the axial bore 36 which allows a predetermined film of fluid to exist between the bore and the shaft portion 48. Formed on the surface of the central shaft portion 48 is the helical groove 54 with a first end of the groove F adjacent the thrust washer 34 and the second end Fa adjacent the thrust washer 26. The cross-section of the helical groove is progressively less from the first end of the groove to the second end.

The tubular housing portion 12 has formed therethrough a first fluid outlet post 56 which communicates between reservoir 38 and bore 36. Similarly second, third and fourth outlet posts 58, 60 and 62, respectively, are formed through housing portion 12 communicating from reservoirs 40, 42 and 44, respectively, to bore 36. The shaft portion 48 has extending therefrom the first lug 64 adjacent one end and a second lug 66 adjacent the other end. Lug 64 engages in the notch 30 of first thrust washer 26 with lug 66 engaged in notch 30a of second thrust washer 34 whereby the thrust washers 26 and 34 rotate with the shaft.

The numeral 68 designates a hub including the inner reduced portion 70 which terminates in the outer larger portion 72. The hub portion 72 has formed therein the threaded hole 74 in which is positioned the set screw 76 which engages the shaft portion 50. The hub 68 may mount a pulley driven by a belt, not shown, to thereby rotate the shaft. The hub 68 has formed in the portion 70 thereof the annular recess 77 in which is positioned the O-ring 78 which makes sealing contact with the shaft portion 50 and the hub. The annular seal 22 makes sealing contact with the portion 70 of the hub 68 and the seal 18 makes sealing contact with the shaft portion 52. As a result the unit is completely sealed. Prior the final sealing of the unit gaseous nitrogen may be introduced into the housing to create an artificial atmosphere.

A reel (not shown) to be driven may be secured to the shaft portion 52 and the housing H secured by means of bolts through the holes 14 of the flange 13.

A fluid lubricant is maintained in the reservoirs in a partially filled condition and it communicates with the shaft as a film thereon and in the helical groove 54. As the shaft is rotated, the fluid lubricant is drawn from the reservoirs by means of the spiral grooves in the thrust washer 34 to and through the outlet posts 56, 58, 60 and 62 to and upon the shaft due to the pickup action of the helical groove 54 and moved thereby under pressure to the spiral groove 28 of thrust washer 26 where it is carried radially outwardly by the groove 28 on thrust washer 26 to the reservoirs and from the reservoirs out the reservoir outlet posts 56-62 as heretofore mentioned under pressure created by the rotative action of the helical groove on the rotating shaft. As a result of the above, the shaft is totally supported on a film of oil between shaft portion 48 and bore 36 with no contact between the shaft and the bore 36 at any time. It will be seen that the interior of the spindle is self-pressurized with no exteriorly supplied pressure upon the lubricant.

Having thus described the invention, what is claimed as new and desired to be secured by Letters Patent is:

1. A hydrokinetic spindle comprising:
   (a) a housing,
   (b) a shaft having a first end and a second end,
   (c) means mounting said shaft in said housing for relative rotative motion between said housing and said shaft,
   (d) said housing including reservoir means for a lubricating fluid spaced radially outwardly of said shaft,
   (e) said shaft having a helical groove formed in the surface thereof and extending thereon and having a first end and a second end with the cross-section of the groove progressively decreasing from the first end of the groove to the second end of the groove,
   (f) means for conducting the lubricating fluid from said reservoir means to said first end of said helical groove and upon said shaft,
   (g) means for conducting the lubricating fluid from said second end of said helical groove and from upon said shaft to said reservoir means for creating hydraulic pressure in conducted lubricating fluid upon the shaft as relative rotation between said shaft and said housing occurs, and
   (h) means for sealing the lubricating fluid within the housing.

2. The device of claim 1, in which said means mounting said shaft in said housing includes a tubular formation connected to said housing and forming a bearing and in which said shaft is mounted.

3. The device of claim 2, in which said means for conducting a fluid from said reservoir means to said first end of said helical groove includes at least one outlet post from said reservoir means and communicating with said helical groove.

4. The device of claim 1, in which said means for conducting a lubricating fluid from said reservoir means to said first end of said helical groove includes at least one outlet post communicating with said helical groove.

5. The device of claim 4, in which said means for conducting a lubricating fluid from said second end of said helical groove to said reservoir means includes conduit means carried by said shaft communicating with said helical groove and said reservoir means.

6. The device of claim 1, in which said means for conducting a lubricating fluid from said second end of said helical groove to said reservoir means includes conduit means carried by said shaft communicating with said helical groove and said reservoir means.

7. A hydrokinetic spindle comprising:
   (a) a housing,
   (b) a shaft,
   (c) means mounting said shaft in said housing for relative rotative motion between said housing and said shaft,
   (d) said housing including reservoir means for a lubricating fluid spaced radially outwardly of said shaft,
   (e) said shaft having a helical groove formed in the surface thereof and extending thereon and having a first and second end for picking up a predetermined amount of lubricating fluid at a first portion of the shaft and directing the lubricating fluid to and upon the shaft under pressure to a second portion of the shaft,
   (f) means for conducting the lubricating fluid from said reservoir means to said first portion of said shaft and upon said shaft,
   (g) a thrust washer carried by said shaft with a spiral groove formed on a face of said washer for conducting the lubricating fluid from said second portion of said shaft and from upon said shaft to said reservoir means for creating hydraulic pressure in conducted lubricating fluid upon the shaft as relative rotation between said shaft and said housing occurs, and
   (h) means for sealing the lubricating fluid within the housing.

8. The device of claim 1 wherein the first end of the helical groove is adjacent to the first end of the shaft and wherein the second end of the helical groove is adjacent to the second end of the shaft.

9. The device of claim 7 wherein the thrust washer is carried by said shaft by a notch formed in the inner edge of the thrust washer and a lug extending from the shaft and engaging in the notch of the thrust washer.

10. The device of claim 1 wherein the helical groove tapers from the first end to a point in a direction opposite from the second end of the groove to allow ease of manufacture.

* * * * *